The specification on this patent is not in print.
W. A. Burt.
Solar Compass.
No. 9428X
Patented Feb. 25, 1836.
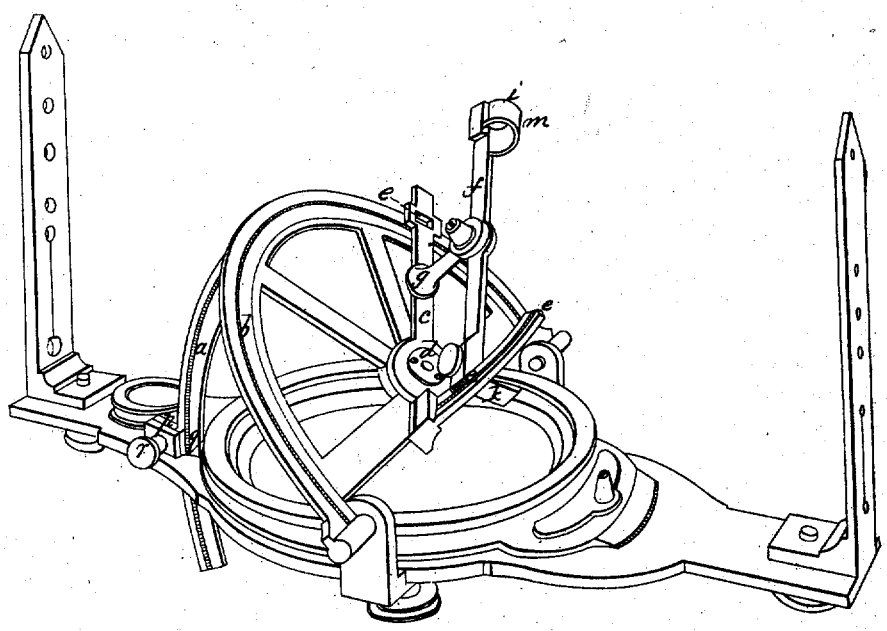

William A. Burt Mount Vernon Ter. of Michigan
(Patented February 25. 1836)
The Schedule referred to in these Letters Patent and making
part of the same, containing a description in the words of the said
William A. Burt himself of his improvement in the instrument for
determining the variation of the Needle, the true meridian and
the apparent time.

Be it known that I William A
Burt of Mount Vernon. Macomb County. Territory of Michigan
have made an improvement, being an instrument for determining
the variation of the needle, the true meridian, and the apparent
time, which is described as follows reference being had to the
annexed drawing of the same making part of this specification.
This instrument is supposed to be attached to a circumferenter
or some similar instrument having a level in it. The arc (a)
is graduated to half degrees and works in a clamp (p) with a ve
nier (q) and elevates the arc (b) to the latitude of the place and
is secured by the clamp screw (r), which arc is also graduated
to half degrees. Upon the arc (b) is fixed a moveable limb (c) hav
ing an opening (O) for a nonius, which limb turns on the centre
(d) and moves parallel on the arc (b). Upon the moveable limb (c)
is fixed an arc (e) for bringing the arm (f) to the sun & moons
declination. Upon the moveable limb (c) is also fixed the sup
port (g) upon which rests the arm (f) bearing the convex lens
(i) for converging the rays of the sun, and throwing, and
throwing them upon the plate (k) which is marked with three
lines, and upon the middle one of which, the true meridian
is shown. There is also a dark Glass (n) placed over the convex
lens. <u>Operation</u>; First place the Instrument level;
elevate the arc (b) to the latitude of the place and clamp it
adjust the arm (f) to the sun or moons declination, and also
clamp it; move the limb (c) to the hour of the day. marked on
the limb (b) which will throw the sun's image upon the plate (K) and when brought upon the centre line, will shew the true meridian. The difference between this and that shewn by the needle, will be the variation, and the nonius in the [illegible] (c) will shew the apparent time. What I claim as my invention, is the before described instrument for shewing the variation of the needle, by giving the true meridian, & the apparent time.

Witnesses
A. A. Vansleard
Wm. P. Elliot

William A. Burt (450)

Patented 25th of Feby 1836

[illegible] A. H. Keane (Recd. & Recorded December 31. 1838)

(Drawing)